United States Patent

Mennicke et al.

[11] Patent Number: 5,883,234
[45] Date of Patent: Mar. 16, 1999

[54] PROCESS FOR DYEING CELLULOSIC MATERIALS WITH DISAZO DYESTUFFS

[75] Inventors: Winfried Mennicke, Leverkusen; Klaus Kunde, Neunkirchen-Seelscheid, both of Germany

[73] Assignee: Bayer Aktiengesellschaft, Leverkusen, Germany

[21] Appl. No.: 933,206

[22] Filed: Sep. 18, 1997

[30] Foreign Application Priority Data

Sep. 23, 1996 [DE] Germany .................. 196 38 891.0

[51] Int. Cl.⁶ ...................... C09B 35/029; C09B 35/037; D06P 3/62; D21H 21/28

[52] U.S. Cl. .................... 534/829; 534/833; 534/835; 534/582; 534/588; 534/599; 8/527; 8/681; 8/687; 8/918; 8/919; 162/162

[58] Field of Search .................... 534/829, 833, 534/835; 8/527, 681, 687, 919; 162/162

[56] References Cited

U.S. PATENT DOCUMENTS

| 982,507 | 1/1911 | Laska | 534/835 |
| 4,988,805 | 1/1991 | Kunde | 534/717 |
| 5,034,017 | 7/1991 | Kunde et al. | 8/681 |
| 5,288,294 | 2/1994 | Käser | 8/687 |
| 5,808,016 | 9/1998 | Kunde | 534/829 X |

FOREIGN PATENT DOCUMENTS

| 0 204 244 A2 | 12/1986 | European Pat. Off. |
| 0 218 143 A2 | 4/1987 | European Pat. Off. |
| 0 301 350 A2 | 2/1989 | European Pat. Off. |
| 0 391 170 A1 | 10/1990 | European Pat. Off. |
| 0 534 903 A1 | 3/1993 | European Pat. Off. |
| 35 20 389 A1 | 12/1986 | Germany. |
| 56-145962 | 11/1981 | Japan. |

OTHER PUBLICATIONS

Derwent Abstract of JP 56–145,962, Nov. 13, 1981.
Colour Index, 3rd Ed., vol. 4, p. 4160, C. I. 21600, 1971.
Abstract of Japanese Patent 61 283 666 Dec. 13, 1986.

*Primary Examiner*—Fiona T. Powers
*Attorney, Agent, or Firm*—Sprung Kramer Schaefer & Briscoe

[57] ABSTRACT

The novel process for dyeing cellulosic materials with disazo dyestuffs of the formula

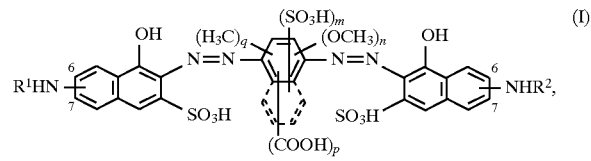

in which the substituents $NHR^1$ and $NHR^2$ are in each case in the 6- and/or 7-position and $R^1$, $R^2$, m, n, p and q have the meaning given in the description, produces blue dyeings with very good fastness properties.

10 Claims, No Drawings

PROCESS FOR DYEING CELLULOSIC MATERIALS WITH DISAZO DYESTUFFS

The present invention relates to a process for dyeing cellulosic materials with certain compounds of the disazo-dyestuffs type, and to novel such compounds and processes for their preparation.

The process according to the invention for dyeing cellulosic materials comprises employing, as the dyestuff, at least one compound of the formula (I)

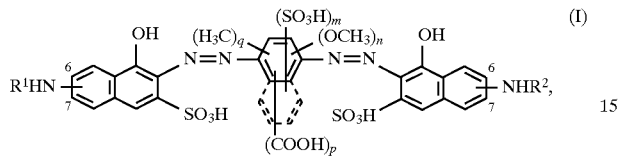

in which
the substituents $NHR^1$ and $NHR^2$ are in the 6- and/or 7-position, preferably of the formula

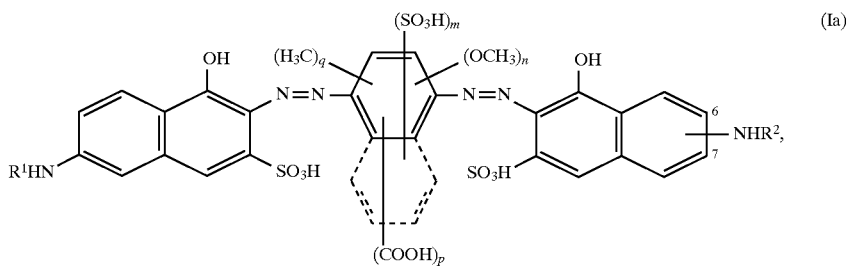

in which
the substituent $NHR^2$ is in the 6- or 7-position, in particular of the formula

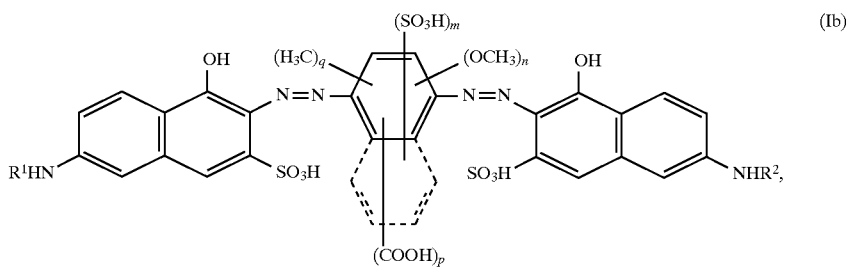

in which, in each case,
$R^1$ and $R^2$ independently of one another represent hydrogen, acetyl, or phenyl or benzoyl which are optionally substituted by $CH_3$, $OCH_3$, $COOH$ or $SO_3H$,
m, n, p and q represent 0 or 1 and
m+p=1.

The dyestuffs of the formula (I) can be employed for the process according to the invention in the form of solid or liquid dyestuff preparations, in particular concentrated aqueous solutions.

The process according to the invention is suitable for dyeing cellulosic materials, in particular for dyeing cotton and regenerated cellulose fibers, by the customary exhaust process for yarns and piece goods and in the continuous process.

The process according to the invention is furthermore particularly suited for dyeing paper.

All grades of paper, in particular sized and unsized papers, are in principle possible as the paper. The process according to the invention is suitable for dyeing paper in the pulp or on the surface.

Compounds of the formulae (I), (Ia) and (Ib), with the exception of the compounds in which $R^1$ and $R^2$ simultaneously represent hydrogen, are novel, and the present invention also relates to these.

Compounds of the formula (I) in which $R^1$ and $R^2$ simultaneously represent hydrogen are known from DE-A-3 520 389, where they are employed as intermediate products for the preparation of tetrakis-azo dyestuffs.

The novel and known compounds of the formula (I) can be prepared by coupling compounds of the formula

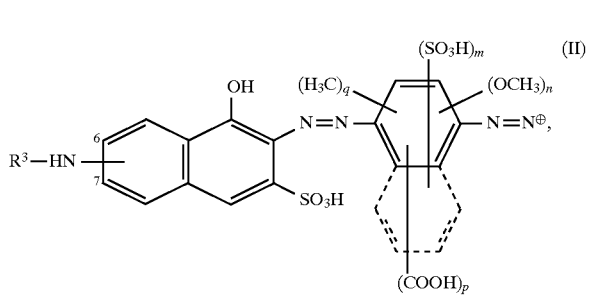

in which the substituent $NHR^3$ is in the 6- or 7-position,
$R^3$ represents acetyl, maleyl, or phenyl or benzoyl which are optionally substituted by $CH_3$, $OCH_3$, $COOH$ or $SO_3H$, and q, m, n and p have the abovementioned meaning, with compounds of the formula

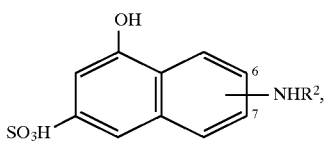
(III)

in which
R² has the abovementioned meaning, and, if appropriate, splitting off the acetyl or maleyl radicals by hydrolysis.

Preferred compounds of the formula (I) are those in which
R¹ and R² independently of one another represent hydrogen, acetyl, or phenyl or benzoyl which are optionally substituted by $CH_3$, $OCH_3$, $COOH$ or $SO_3H$,
m, n, p and q represent 0 or 1 and
m+p=1.

Compounds of the formula (I) in which m+n+p+q=1 or 2 are preferred.

Compounds of the formula (I) in which R¹ and R² independently of one another represent hydrogen, phenyl or 3-carboxyphenyl and the sum (p+n) is zero or 1 are particularly preferred.

The diazonium compounds (II) can be obtained by reducing compounds of the formula

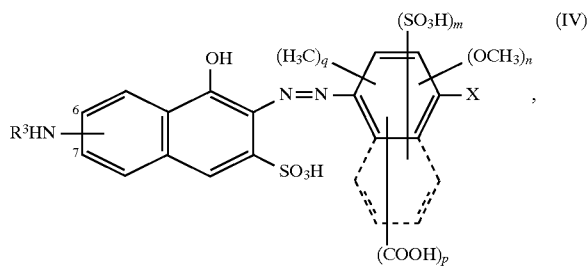
(IV)

in which
the substituent NHR³ is in the 6- or 7-position,
X represents $NO_2$ and
R³, q, m, n and p have the abovementioned meanings,
in a manner known per se to give the amino compounds of the formula

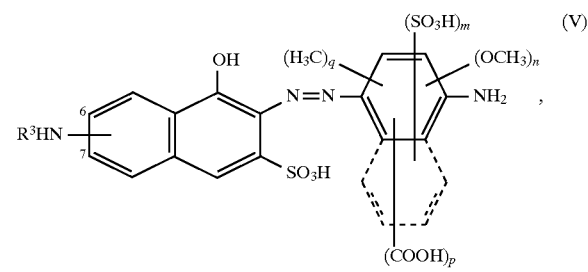
(V)

in which
the substituent NHR³ is in the 6- or 7-position and
R³, q, m, n and p have the abovementioned meaning,
or by hydrolyzing compounds of the formula (IV), in which
X represents

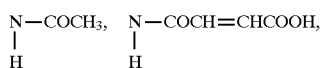

in a manner known per se (if appropriate selectively), to give the amino compounds of the formula (V) and diazotizing these in a manner known per se.

The coupling of the diazonium compounds (II) with the compounds (III) is carried out in an aqueous or aqueous-organic medium, preferably in water, in solution or suspension at 0° to 40° C., preferably at 5° to 20° C., at pH values between 6 and 10, preferably between 6.5 and 9.5; the optionally selective splitting off of the maleyl radical is carried out at temperatures between 60° and 105° C., preferably between 70° and 90° C., at pH values between 2 and 4, preferably between 2.5 and 3.5, and the splitting off of the acetyl radical is carried out at temperatures between 60° and 105° C., preferably between 70° and 90° C., at pH values between 10 and 13, preferably between 11 and 12.

The coupling components of the formula (III) are known.

The compounds (I) can be employed in the form of solid dyestuff preparations, preferably as powders or granules, which optionally comprise customary additives, such as, for example, ionic or nonionic formulating agents and/or dust-removal agents.

The use of liquid preparations, in particular the use of concentrated aqueous solutions, which are preferably free from organic solubilizing agents and comprise at least one compound of the formula (I), is preferred for the process according to the invention. The liquid dyestuff preparations in general comprise 10 to 40% by weight, preferably 20 to 40% by weight, of at least one compound (I) based on the finished preparation.

The compounds (I) dye cellulosic materials, in particular paper, cotton and viscose, in blue shades with good fastnesses to wet processing and light.

The compounds (I) can be used according to the invention by all the processes customary for substantive dyestuffs in the paper and textile industry, in particular in pulp and in surface dyeing of paper for sized and unsized grades, starting from bleached or unbleached pulp of various origins, such as softwood or hardwood sulfite and/or sulfate pulp. They can also be used in the dyeing of yarn or piece goods of cotton, viscose and linen by the exhaust process from a long liquor or in continuous processes.

For dyeing paper in pulp, according to the invention, the compounds (I) can be added to the paper pulp before sheet formation, either to the thick matter after breaking up the cellulose or to the thin matter before feeding to the paper-making machine. In the production of paper sized in the pulp, they are preferably added to the thin matter before addition of the sizing agent.

In the dyeing of paper on the surface, according to the invention, the compound (I) is applied to the sheet which has been formed. This is preferably effected in the size press by dissolving the compound (I) in a concentrated starch solution and applying it to the paper in this form.

The paper dyeings obtained with the compounds (I) according to the invention are distinguished by good fastness to light and wet processing (fastness to bleeding) and fastness to acids, alkalis and alum. The brilliance and clarity of the color shades are also notable. The combination properties with suitable dyestuffs are furthermore very good.

EXAMPLE 1

51.4 g of the compound of the formula

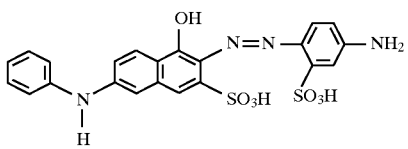

are diazotized with 6.9 g of sodium nitrite and the diazotization product is coupled with 31.5 g of 7-phenylamino-4-hydroxy-2-naphthalenesulfonic acid at a pH of 8.5 and a temperature of 20° C. The dyestuff is precipitated by addition of salt, isolated and dried. It corresponds to the formula

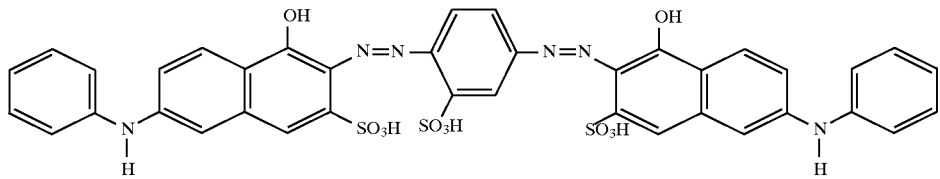

$\lambda_{max}$ = 593 nm

EXAMPLE 2

If the compound of the formula

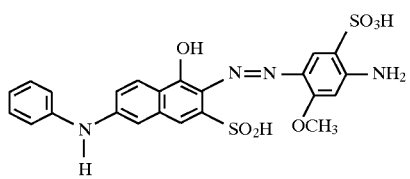

is used instead of the aminoazo compound from Example 1, the dyestuff of the formula

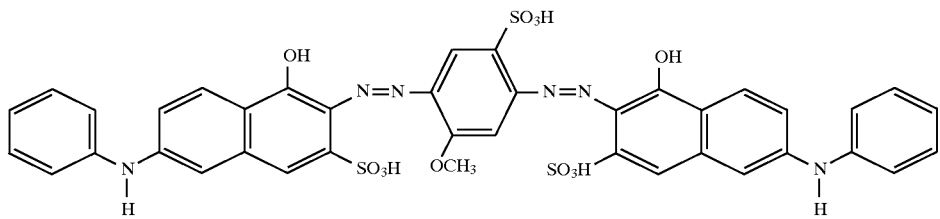

$\lambda_{max}$ = 596 nm is obtained.

EXAMPLE 3

44.4 g of the compound of the formula

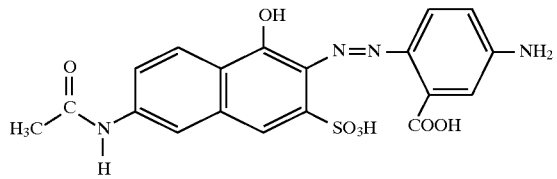

are diazotized in the same way as the amino compound from Example 1, and the diazotization product is coupled with 35.9 g of 7-(3'-carboxyphenylamino)-4-hydroxy-2-naphthalenesulfonic acid. The pH of the batch is brought to 12 with sodium hydroxide solution and the acetyl radical is then split off at 90° C. The dyestuff is precipitated by addition of salt, isolated and dried. It corresponds to the formula

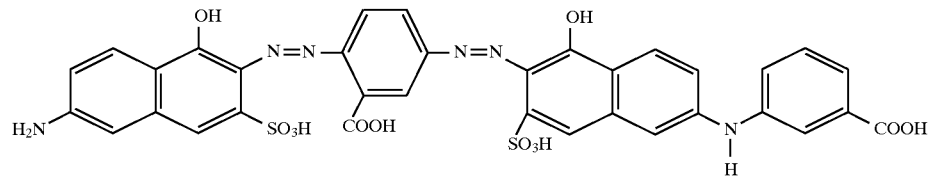

$\lambda_{max}$ = 610 nm

EXAMPLES 4 to 13

Dyestuffs according to the invention are likewise prepared from the diazo and coupling components shown in the following table, analogously to the processes described in Examples 1 and 3.

| Ex. | Diazo Component | Coupling Component | $\lambda_{max}$ |
|---|---|---|---|
| 4 | 4-amino-2-sulfo-phenyl azo coupled to 1-hydroxy-6-phenylamino-3-sulfo-naphthalene | 6-amino-4-sulfo-1-hydroxy-naphthalene | 591 nm |
| 5 | 4-amino-2-sulfo-phenyl azo coupled to 1-hydroxy-6-phenylamino-3-sulfo-naphthalene | 6-(3-carboxyphenylamino)-4-sulfo-1-hydroxy-naphthalene | 593 nm |
| 6 | 4-amino-2-methoxy-5-sulfo-phenyl azo coupled to 6-acetamido-1-hydroxy-3-sulfo-naphthalene | 6-(3-carboxyphenylamino)-4-sulfo-1-hydroxy-naphthalene | 623 nm |
| 7 | 4-amino-2-methoxy-5-sulfo-phenyl azo coupled to 6-acetamido-1-hydroxy-3-sulfo-naphthalene | 6-phenylamino-4-sulfo-1-hydroxy-naphthalene | 618 nm |
| 8 | 5-amino-2-carboxy-phenyl azo coupled to 6-acetamido-1-hydroxy-3-sulfo-naphthalene | 6-phenylamino-4-sulfo-1-hydroxy-naphthalene | 615 nm |
| 9 | 5-amino-2-carboxy-phenyl azo coupled to 6-acetamido-1-hydroxy-3-sulfo-naphthalene | 6-(4-carboxyphenylamino)-4-sulfo-1-hydroxy-naphthalene | 584 nm |
| 10 | 4-amino-3-sulfo-phenyl azo coupled to 1-hydroxy-6-phenylamino-3-sulfo-naphthalene | 6-amino-4-sulfo-1-hydroxy-naphthalene | 590 nm |
| 11 | 4-amino-3-sulfo-phenyl azo coupled to 1-hydroxy-6-phenylamino-3-sulfo-naphthalene | 6-(3-carboxyphenylamino)-4-sulfo-1-hydroxy-naphthalene | 594 nm |
| 12 | 5-amino-2-carboxy-4-methoxy-phenyl azo coupled to 6-acetamido-1-hydroxy-3-sulfo-naphthalene | 6-phenylamino-4-sulfo-1-hydroxy-naphthalene | 618 nm |

-continued

| Ex. | Diazo Component | Coupling Component | $\lambda_{max}$ |
|---|---|---|---|
| 13 | 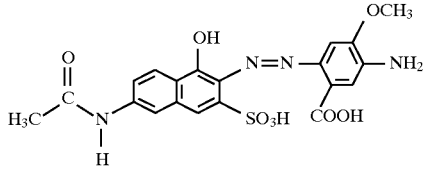 | 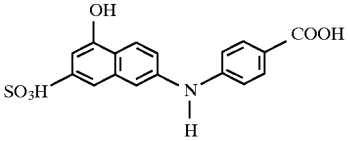 | 616 nm |
| 14 | 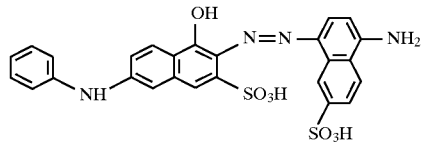 | 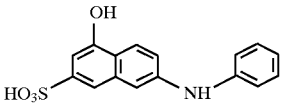 | 638 nm |
| 15 | 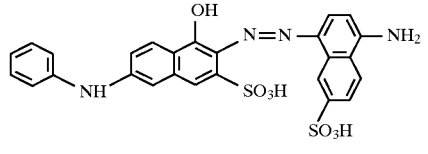 | 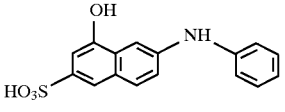 | 641 nm |
| 16 | 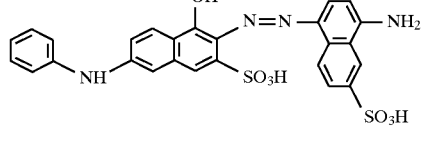 | 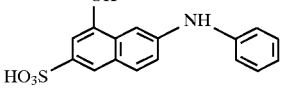 | 641 nm |
| 17 | 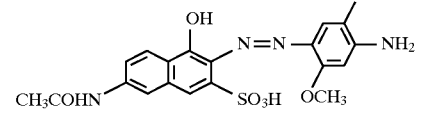 | 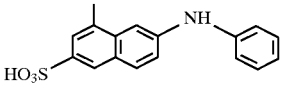 | 629 nm |
| 18 | 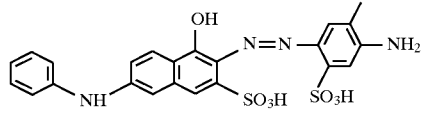 | 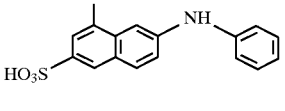 | 637 nm |
| 19 | 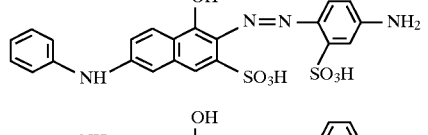 | 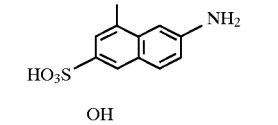 | 630 nm |
| 20 | 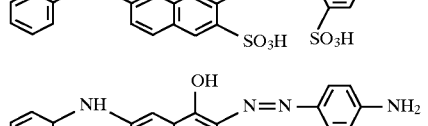 | 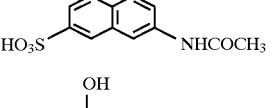 | 624 nm |
| 21 | 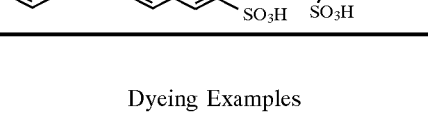 | 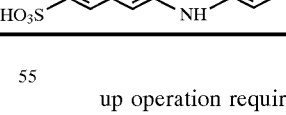 | 631 nm |

Dyeing Examples

EXAMPLE 1

Printing paper 800 kg of sulfate cellulose, bleached, and 200 kg of sulfite cellulose, bleached, are introduced into a pulper into which 14 m³ of production water have been initially introduced, and are broken up until free from specks. The breaking-up operation requires 30 minutes. The broken-up pulp is then transferred to an emptying vat. From the emptying vat, the pulp suspension is beaten with beaters to a degree of freeness of 25° C. SR (according to Schopper-Riegler), and then passes to a mixing vat. In the mixing vat, further additions of 250 kg of kaolin Ia (as a filler) and 1% of dyestuff of the formula

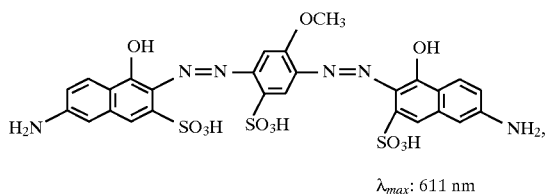

λ$_{max}$: 611 nm calculated with respect to absolutely dry fiber (in the form of an aqueous solution of 20 g/l) are made.

After an absorption time of 15 minutes, 2% of rosin size (absolutely dry) and after 10 minutes 4% of alum (both calculated with respect to absolutely dry cellulose) are added. pH of the pulp suspension: 5.3. This paper pulp passes to the papermaking machine via the process procedure customary in this industry.

EXAMPLE 2

Tissue paper 1000 kg of sulfate cellulose, bleached, are introduced into a pulper into which 14 m³ of production water have been initially introduced, and are broken up until free from specks. The breaking-up operation requires 30 minutes. The broken-up pulp is then transferred to an emptying vat. From the emptying vat, the pulp is beaten with beaters to a degree of freeness of 25° SR and then passes to a mixing vat. In the mixing vat, 1% of dyestuff of the formula

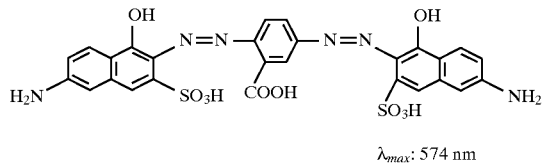

λ$_{max}$: 574 nm calculated with respect to absolutely dry fiber, is added in the form of an aqueous solution of 20 g/l. pH of the pulp suspension: 7. After an absorption time of 15 minutes, this paper pulp passes to the papermaking machine via the process procedure customary in this industry.

EXAMPLE 3

Size press application

In 1000 l of a 10% strength anionic starch solution, 5 kg of dyestuff of the formula are dissolved and the solution is applied to the paper by means of a size press. The amount of solution applied is 1.5 g/m², absolutely dry, per side.

We claim:

1. A process for dyeing cellulosic materials, which comprises contacting the cellulosic materials with at least one compound of the formula

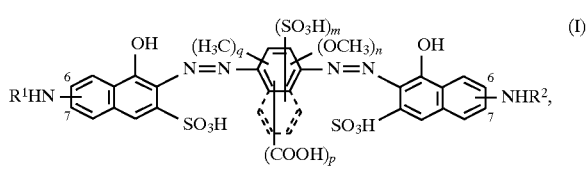

in which the substituents NHR$^1$ and NHR$^2$ are in the 6- and/or 7-position,

R$^1$ and R$^2$ independently of one another represent hydrogen, acetyl, or phenyl or benzoyl which are optionally substituted by CH$_3$, OCH$_3$, COOH or SO$_3$H, m, n, p and q represent 0 or 1 and m+p=1.

2. The process as claimed in claim 1, wherein at least one compound of the formula

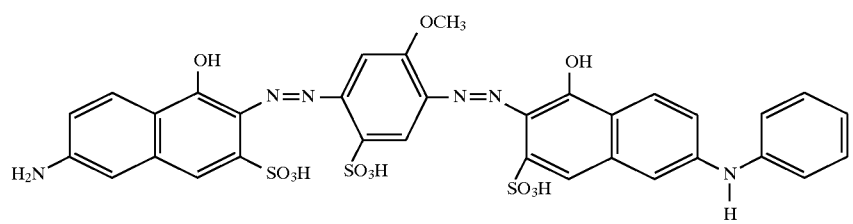

λ$_{max}$: 616 nm

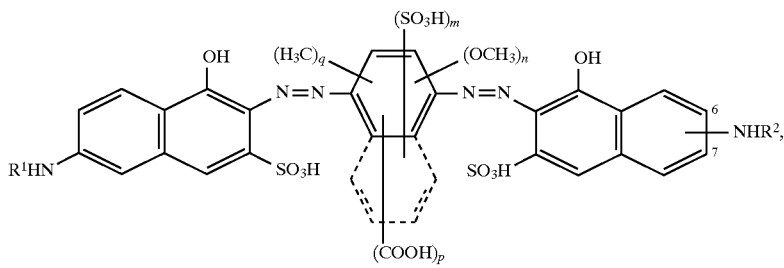

in which
the substituent NHR² is in the 6- or 7-position and
R¹, R², m, n, p and q have the meanings given in claim 1, is employed as the dyestuff.

3. The process as claimed in claim 1, wherein the dyestuff is at least one compound of the formula

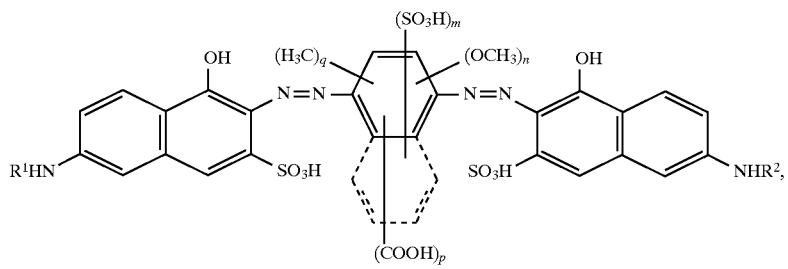

in which
R¹, R², m, n, p and q have the meanings given in claim 1.

4. The process as claimed in claim 1, wherein the cellulosic materials are cotton or regenerated cellulose fibers, which are dyed by the exhaust process or in the continuous process.

5. The process as claimed in claim 1, wherein the cellulosic materials are paper.

6. The process as claimed in claim 1, wherein the compound (I) is employed in the form of a liquid dyestuff preparation which comprises 10 to 40% by weight of at least one compound of the formula (I), based on the finished preparation.

7. A compound of formula (I)

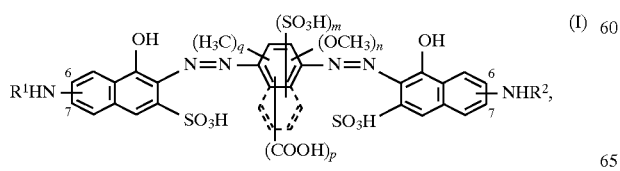

in which the subtituents NHR¹ and NHR² are the 6- and/or 7-position,
R¹ and R² independently of one another represent hydrogen, acetyl, or phenyl or benzoyl which are optionally substituted by $CH_3$, $OCH_3$, COOH or $SO_3H$,
m, n, p and q represent 0 or 1 and
m+p=1,
with the exception of the compounds in which R¹ and R² simultaneously represent hydrogen.

8. A compounds as claimed in claim 7, wherein the compound is of formula (Ia)

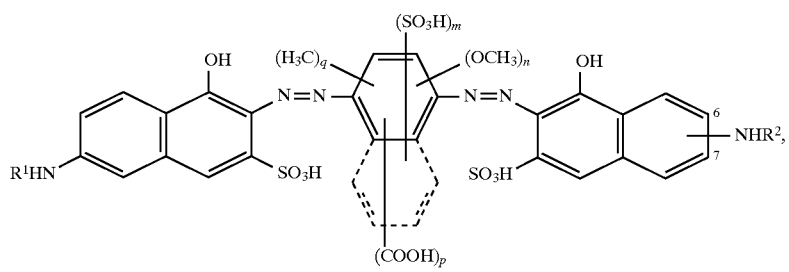

9. A compounds as claimed in claim 7, wherein the compound is of formula (Ib)

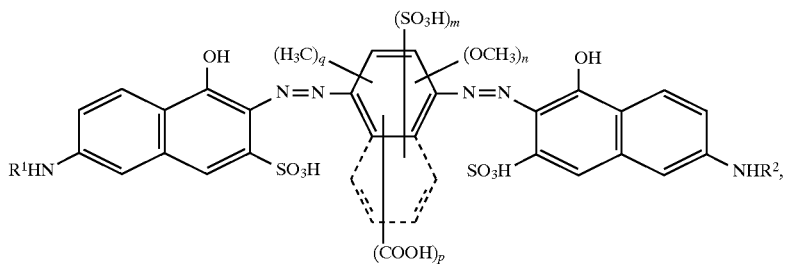 (Ib)

10. A process for the preparation of a compound of the formula (I) as claimed in claim 7, which comprises coupling a compound of the formula

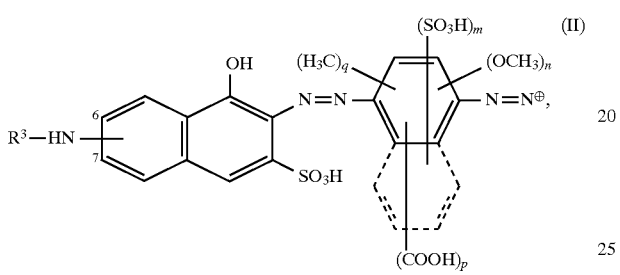 (II)

in which
  the substituent NHR$^3$ is in the 6- or 7-position,
  R$^3$ represents acetyl, maleyl, or phenyl or benzoyl which are optionally substituted by CH$_3$, OCH$_3$, COOH or SO$_3$H, and
  q, m, n and p have the meaning given in claim 7, with a compound of the formula

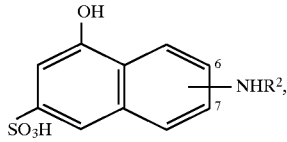 (III)

in which the substituent NHR$^2$ is in the 6- or 7-position and
  R$^2$ has the meaning given in claim 7,
  and, optionally, splitting off the acetyl or maleyl radicals present by hydrolysis.

* * * * *

UNITED STATES PATENT AND TRADEMARK OFFICE
CERTIFICATE OF CORRECTION

PATENT NO. : 5,883,234

DATED : March 16, 1999

INVENTOR(S) : Winfried Mennicke, et al.

It is certified that error appears in the above-identified patent and that said Letters Patent is hereby corrected as shown below:

Col. 14, Line 13            After "$NHR^2$ are " insert --in--

Signed and Sealed this

Thirtieth Day of November, 1999

Attest:

Q. TODD DICKINSON

Attesting Officer      Acting Commissioner of Patents and Trademarks